July 9, 1957     F. HERZEGH     2,798,529
DIVIDED RIM AND VALVE STEM ASSEMBLY FOR TUBELESS TIRES
Filed Nov. 10, 1953     4 Sheets-Sheet 1
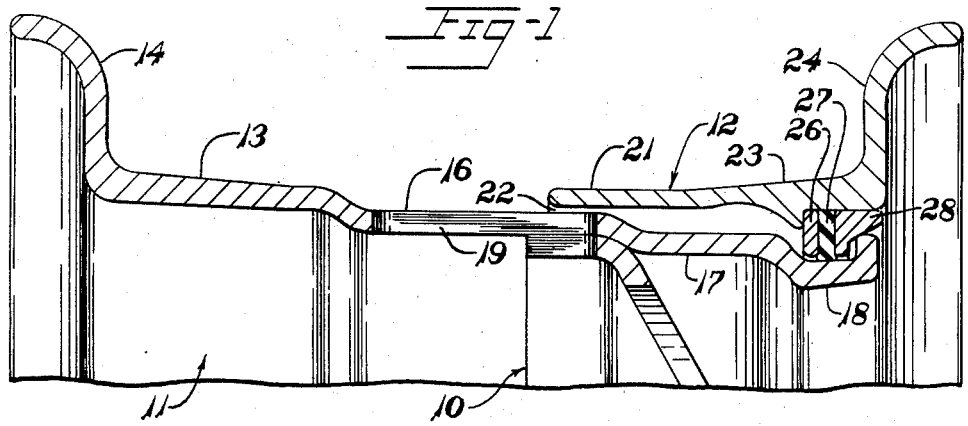
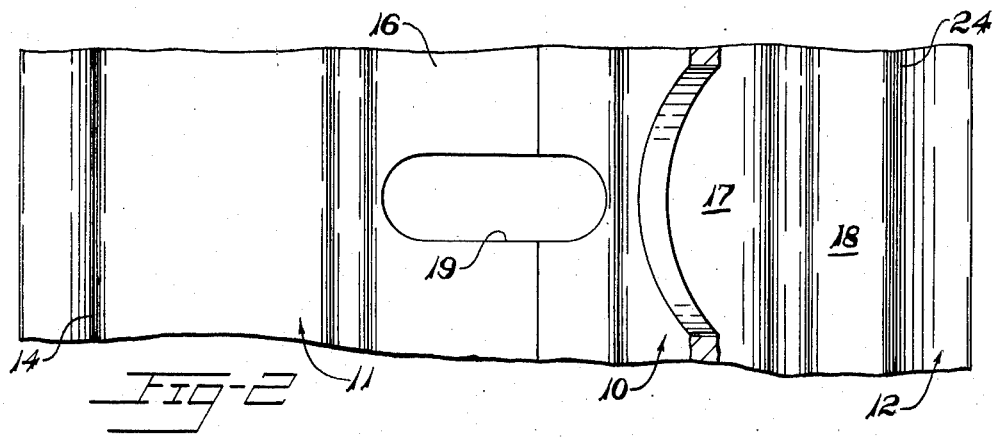
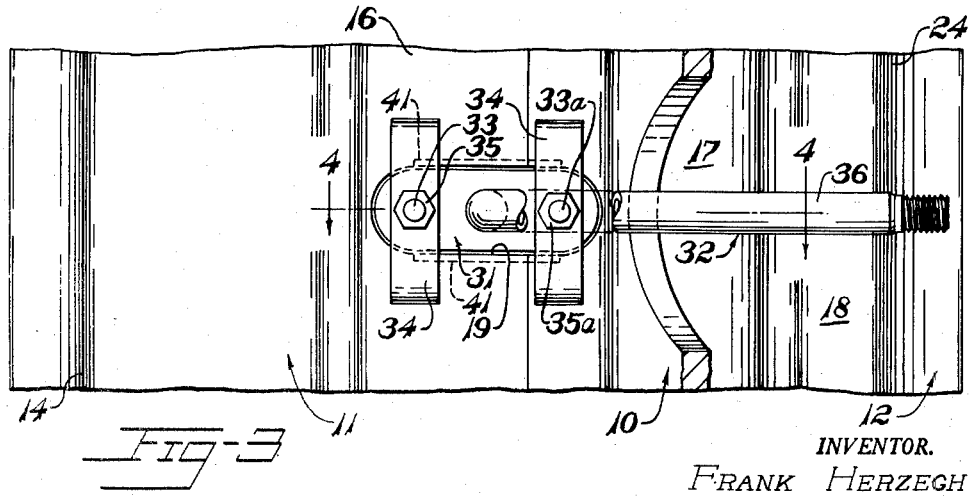
INVENTOR.
FRANK HERZEGH
BY C. E. Tripp
ATTY.

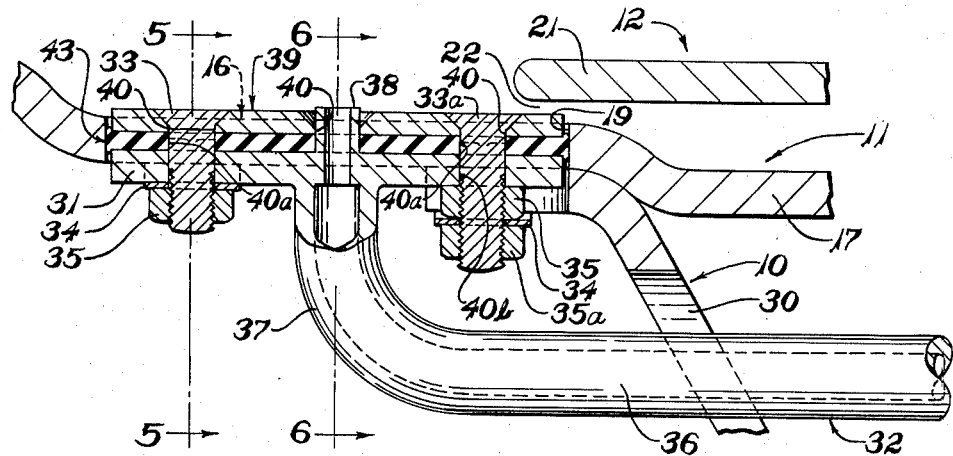
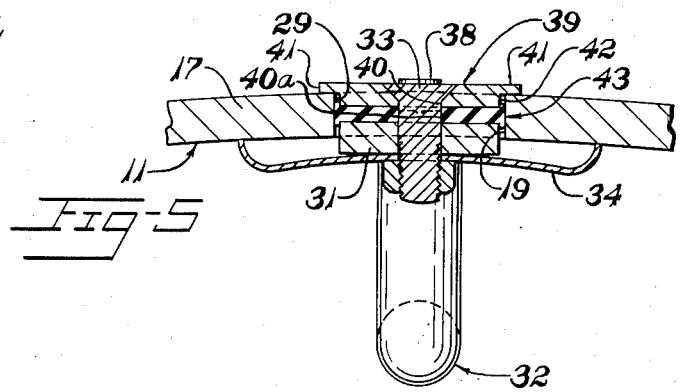
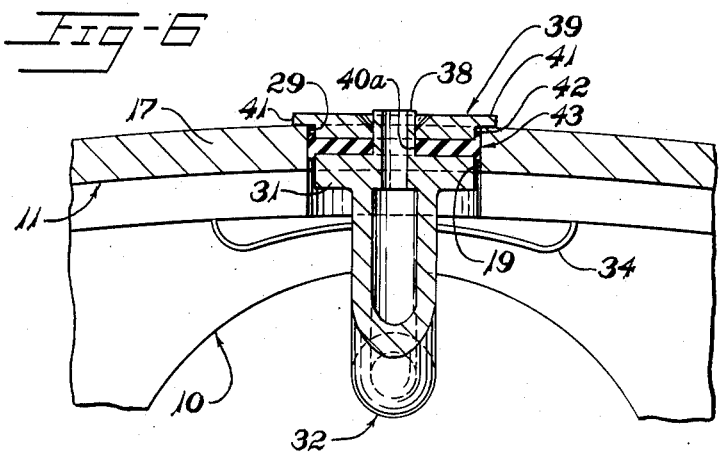

July 9, 1957  F. HERZEGH  2,798,529
DIVIDED RIM AND VALVE STEM ASSEMBLY FOR TUBELESS TIRES
Filed Nov. 10, 1953  4 Sheets-Sheet 3
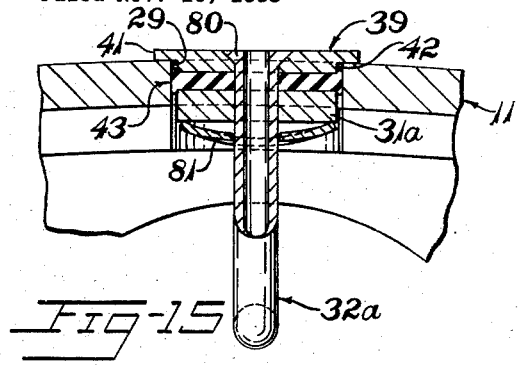
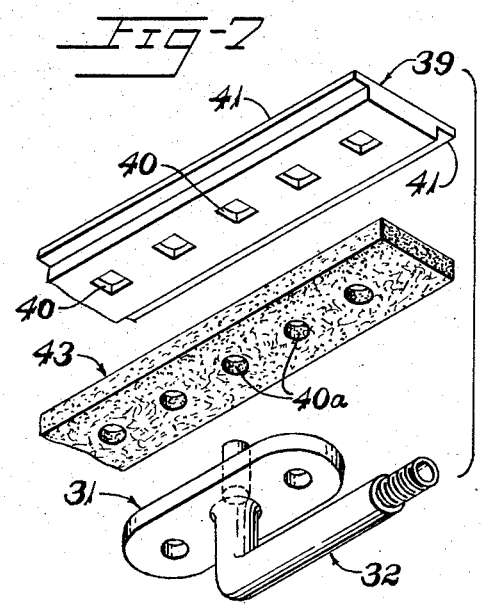
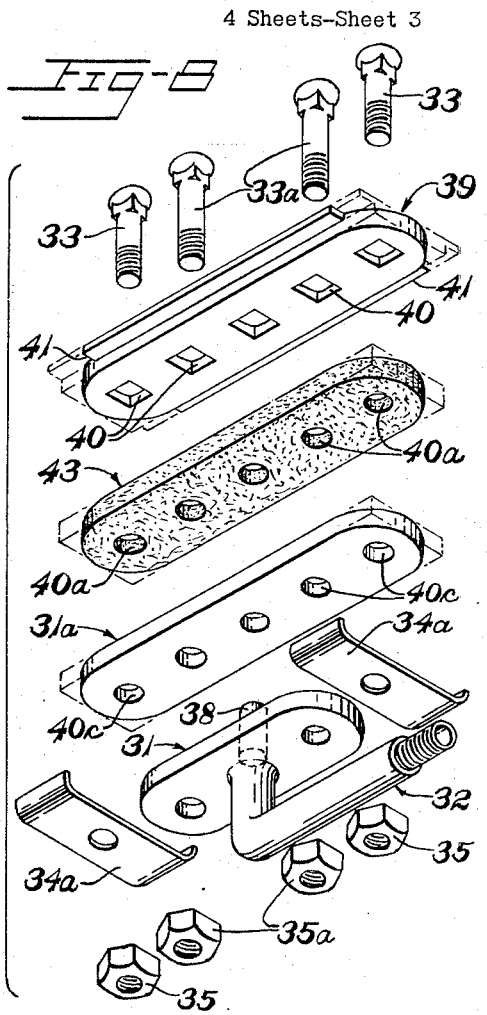
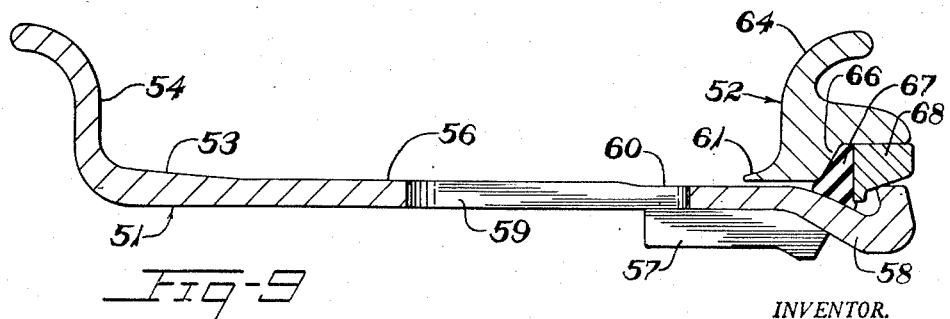
INVENTOR.
FRANK HERZEGH
BY C. E. Tripp
ATTY.

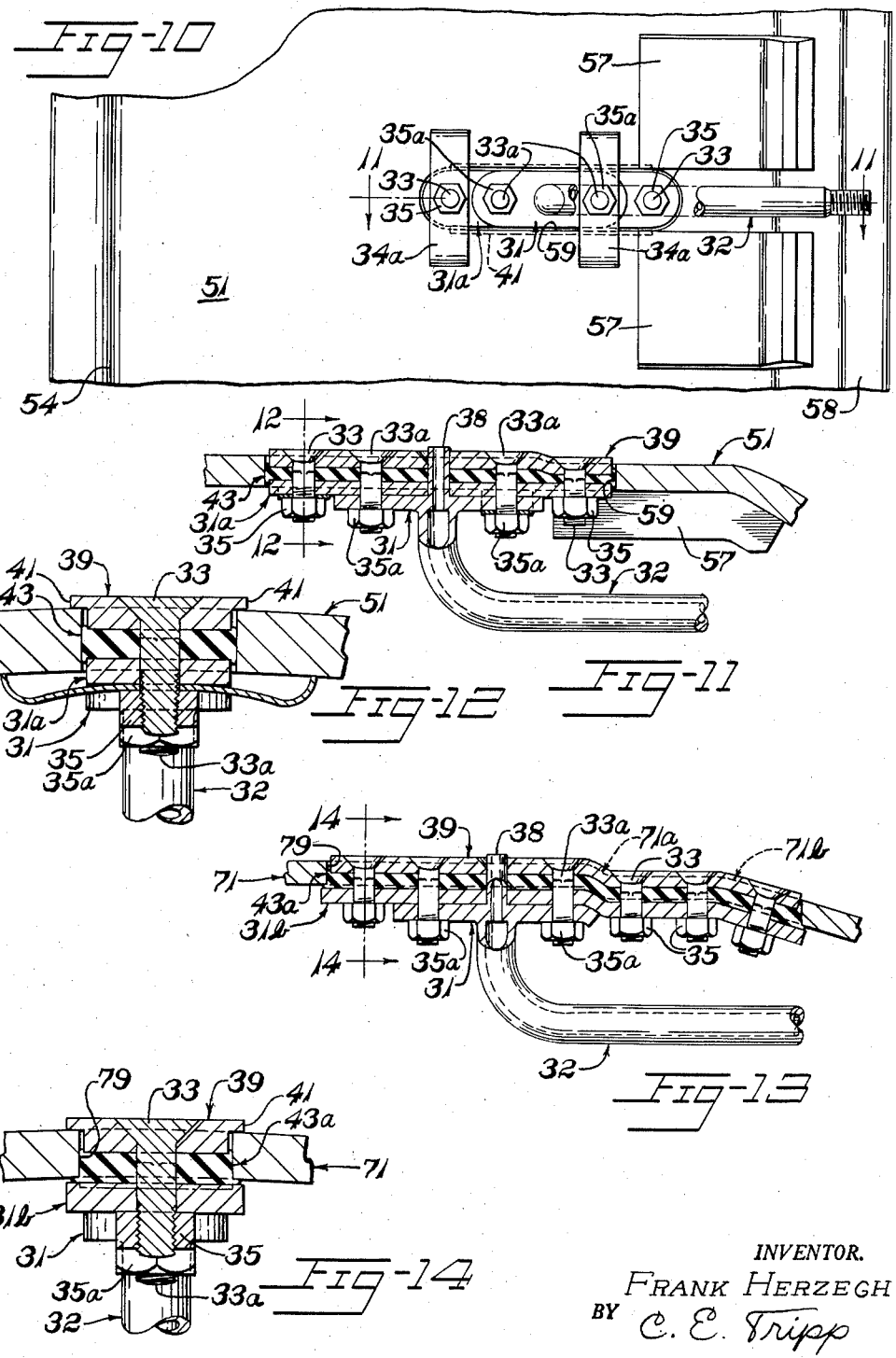

United States Patent Office 2,798,529
Patented July 9, 1957

2,798,529

DIVIDED RIM AND VALVE STEM ASSEMBLY FOR TUBELESS TIRES

Frank Herzegh, Cleveland, Ohio, assignor to The B. F. Goodrich Company, New York, N. Y., a corporation of New York Application November 10, 1953, Serial No. 391,225

8 Claims. (Cl. 152—427)

This invention relates to vehicle rims of the divided or split-type intended for the reception of tubeless pneumatic tires. Rims of the type to which this invention relate are commonly fitted to heavy duty vehicles such as trucks or the like since the carcasses of tires designed for such service are stiff as compared to those for most passenger cars. The one piece or drop center type rim is usually not employed in heavy duty service because in such service one rim section including the side flange must be removable in order that the tire may be slid axially upon the rim during the tire mounting and demounting operations. Means have been devised for rendering air-tight the joints between the fixed and removable rim sections a suitable construction being disclosed in my copending application Serial No. 344,441, filed March 24, 1953, but other problems remain.

Since rims for this service are relatively wide, it has been customary to bend the valve stems of inner tubes before mounting the tire and tube in order to cause the outer end of the valve stems to be accessible. This has meant, then, that rims designed for use with inner tubes have been formed with an elongated slot to facilitate entry and removal of the bent valve stem and tube during mounting and demounting of the parts.

The problem with which this invention is concerned lies in closing slots including slots of variable shapes and dimensions in pneumatic tire rims so as to permit their use with tubeless pneumatic tires, while providing an inflation valve for the tubeless tire to replace the valve previously supplied as a part of an inner tube. I have found in practice that solution of this problem is complicated by several considerations.

These are:
1. The axial length of the slot varies with the rim size.
2. There is no standard specification for the axial length of the slot in any given rim size or manufacture.
3. It is desirable that the tubeless tire valve assembly be capable of mounting in existing rims by field organizations, without the need for expensive equipment and highly skilled labor.
4. Since tubeless truck tires are not yet standard equipment it is desirable to provide a detachable or removable valve stem mounting so that the rim could be reconverted for use in conjunction with an inner tube, in the field, and without the need for welding torches or the like.
5. The removable rim section overlaps the major or wheel mounted rim section and often lies over a portion of the valve slot formed in the major rim section.
6. Although there is always some clearance between the demountable and major rim sections the clearance is not very large, being in the order of 1/32" to 1/16".
7. The slot in the major rim section may extend along portions of that section which are of different diameters, that is, which have shoulders along the slot.

I have found that the problems presented by these considerations can be solved by a simple valve assembly that is detachably mounted directly in the rim slot as follows:

First, there is a backing plate member which generally conforms to the contour of the rim along the slot but is also formed to resist expulsion of the plate through the slot by air under pressure within the rim and tire assembly. The outer side of the backing plate is exposed directly to air under pressure in the inflation space.

Second, there is a rubber sealing member which is disposed within and conforms to the edge wall of the rim slot, and one face thereof lies against the inner side of the backing plate.

Third, there is a pressure plate member which engages the other face of the rubber sealing member, and by means of screws passing through all members the pressure plate is drawn towards the backing plate thereby squeezing the sealing member and causing the rubber material thereof to flow in the plane of the slot much in the manner of a liquid, until the edge of the rubber sealing member firmly and sealingly engages the edge wall of the rim slot.

Fourth, there is a valve stem mechanically connected by one means or another to the pressure plate with a nipple extending through the sealing member and backing plate to maintain an air passage into the inflation space.

In the preferred form of the invention, the backing plate and in some cases the pressure plate, are made of thin malleable metal of strip-like form and of a width suitable for the rim slot. They are formed with a regularly spaced row of apertures therein, and are readily cut to length and fitted for accommodation with the rounded ends of the rim slot. Since I have found in practice that the variation in width of rim slots is not as great as that in their length, only a few widths of strips will be required to serve virtually all current rims. The same considerations apply to the rubber sealing strip. Thus basically all that is required for the sealing of the rim slot for mounting a tubeless tire is the cutting of thin preformed strips to the proper length for conformance with the rim slot. Then, the mounting bolts or screws are inserted and set up, and the backing and pressure plates are drawn toward one another to cause the rubber sealing member to flow laterally, or in the plane of the slot toward the edge wall of the slot and thus exert a high unit sealing pressure along the edge wall of the slot. The action just described also seals around the bolts. If the rim slot extends over a rim section having more than one diameter, since the metal members are thin and malleable, they can be easily hammered or beaten into conformity with the rim contours, thereby increasing the universality of the application of the invention. A more detailed description of the invention which will enable those skilled in the art to practice the same follows:

In the drawings,

Figure 1 is a section of the divided rim and wheel assembly taken through the rim slot, but before the valve is mounted.

Figure 2 is a developed view showing the shape of the rim slot.

Figure 3 is a view corresponding to Figure 2 with the sealing valve assembly of one form of the invention mounted in place.

Figure 4 is a section taken on a larger scale along 4—4 of Figure 3.

Figures 5 and 6 are, respectively, sections taken along 5—5 and 6—6 of Figure 4.

Figures 7 and 8 are exploded views of elements making up the form just described and a modified form of the invention, although these figures also illustrate preparation steps characteristics of all forms of the invention.

Figure 9 is a rim section of the demountable type wherein the rim is detachable from the wheel and the valve stem slot extends over rim parts disposed in more than one plane or rim diameter.

Figure 10 is a developed view of the valve assembly applied to the rim of Figure 9.

Figure 11 is a section taken on 11—11 of Figure 10.

Figure 12 is a section taken on 12—12 of Figure 11 but on a somewhat larger scale with clearances slightly exaggerated.

Figure 13 is a section of an assembly corresponding to Figures 4 and 11 with a modified form of pressure plate.

Figure 14 is a section taken on 14—14 of Figure 13, and

Figure 15 is a modified form with the valve stem carried by the backing plate.

Referring now to the embodiments of the invention illustrated in Figures 1 to 6, Figure 1 illustrates a rim of the type wherein the major rim section is permanently affixed to the wheel. Here are shown a sheet metal wheel 10, a major rim section 11 and a detachable rim section 12. Major rim section 11 is provided with a tapered tire bead-receiving seat 13 and a restraining flange 14. The mid portion of the section is slightly depressed (reduced in diameter) as at 16 and still further depressed at 17, the latter section terminating in a groove or gutter 18. Formed at the mid portion of the rim section 11 is an elongated slot 19 having rounded ends. As mentioned briefly before, the length of slot 19 often varies from rim size to rim size and even from rim manufacturer to rim manufacturer for a given rim size. The width of the slot is, however, usually standardized for a given rim size or range of rim sizes.

The detachable rim section 12 has a lip or flange 21 that is essentially cylindrical and overlies the rim slot 19 in the construction shown. However, there is a clearance 22 in the nature of 1/32 to 1/16 of an inch on the radius to provide for manufacturing tolerances, to facilitate mounting and demounting of the rim section 12, and to tolerate a certain amount of rusting. The rim section 12 is, in a tubeless tire assembly, circumferentially continuous. This section is formed with a tapered tire bead seat 23 and a generally radial retaining flange 24. In order to provide an air-tight seal between the main rim section 11 and the detachable section 12, suitable sealing means are provided as disclosed in my aforementioned application, which may include a split inner backing ring 26, a rubber sealing ring 27 and a split wedge ring 28. These parts cooperate under the expansive forces of the air under pressure within the tire and rim to perfectly seal the joint between the rim sections 11 and 12. For purposes of this invention, other seals at the joints of rim parts 11 and 12 may be used. In practice the rim parts and sealing parts shown in Figure 1 will not be assembled before the valve assembly of this invention is assembled in rim slot 19, but the parts are shown mounted with the slot free of the valve assembly for clarity.

In Figure 3 the valve assembly is shown mounted as seen from within the rim. Here can be seen a slot-conforming pressure plate 31 which in this embodiment of the invention carries the bent valve stem 32 integrally and is held in place by screws 33, 33a and nuts 35, 35a. Also provided are spring clips 34 for retaining purposes as will be explained presently.

Details of the construction best appear in Figures 4, 5 and 6.

As seen in Figure 4 the valve stem 32 has a straight portion 36 extending from a bent portion 37 integral with, brazed or soldered to the pressure plate 31 in this modification of the invention. Extending past the pressure plate is a nipple 38 which serves as a non-blockable inflation passage. The backing plate previously mentioned is indicated at 39 and is provided with a row of equally spaced square holes 40. As seen in Figure 4 two of the holes 40 receive the screws, which have squared shanks to take torque, and an intermediate hole receives the nipple 38. Extending from the sides of backing plate 39 are thin flanges 41 which are dimensioned so as to freely be accommodated by the clearance 22 between the fixed and removable rim sections, the remainder or thickened portion of the plate extending partially into the slot. Flanges 41 serve to prevent pressure within the tire rim from expelling the valve assembly, and the thickened portion will withstand inflation pressure without buckling. Also supplied is a rubber sealing member or strip 43 which has a series of spaced holes 40a aligned with the holes 40 in the backing plate. In the form of the invention shown the sealing member is of a thickness so that it can be entirely confined within the wall thickness of the rim section.

The preparation and mounting of the assembly is quite simple. The backing plate, pressure and sealing member may be supplied in the form of elongated strips as seen in Figure 7. In case a large member of rims of a given slot length are to be fitted, the pressure plate, since it carries the valve stem, may be preformed to length during its manufacture. The strips are cut to length and rounded to fit the valve slot in the rim it being recalled that although the slots vary considerably from rim to rim the width of slots do not vary to the same extent so that only a few width of strips need be stocked. After the strips are trimmed to length the backing plate 39 is slipped into the slot, the rubber sealing member and the pressure plate are aligned therewith, and the screws 33, 33a inserted in their respective holes. It will be noted in the form shown in Figure 4 the assembly extends into the wheel section flange. Thus, screw 33a is longer than screw 33. Nuts 35 are now applied and tightened while holding the backing plate 39 firmly against the rim so that its flanges 41 firmly engage the rim. As tightening proceeds the rubber material of the sealing member being completely confined, acts somewhat in the manner of a liquid and flows laterally or in its own plane, tightly pressing against the edges of the slot as well as against the screws and the nipple 38. Simultaneously the screws are stretched within their elastic limit so that the resulting "spring back" of the screws maintains a deforming force on the rubber strip so that the air seal is maintained. The nipple 38 in the form of the invention described not only prevents closure of the inflating aperture in the sealing member due to flow of the material, but insures an absence of voids in the sealing material except those that occur initially around the edge of the slot, so that all fluid pressure effect developed in the rubber material is exerted to seal the edge of the slot, as well as the screws and the valve nipple.

In order to prevent accidental displacement, particularly when there is no inflation pressure, spring clips 34 bridge the assembly and are retained by the screws. These clips are provided as a safety measure, the sealing pressure of the rubber member will ordinarily firmly retain the parts. It can now be seen why screw 33a is longer than screw 33, this being in order to accommodate the thickness of the wheel 10, and an extra nut 35a can be applied to mount a clip member 34 at the wheel section 10, as seen in Figure 4. The thickness of flanges 41 (1/64″-1/32″) is such that they are readily cleared by the removable rim section 12, as seen in Figure 4.

It can be seen that only the simplest tools are required for trimming the ends of the strips to length, the ease of application of the device without modification of the rim will now be apparent, and it is equally apparent that the device can be readily removed at any time and the rim restored to its original condition for reception of the valve of an inner tube.

The form of the invention shown in Figures 8 to 12 functions like the embodiment just described but is adaptable for use on longer slots, as well as on slots of different lengths. In the previously described form the flange 31 from which the valve stem 32 extends was selected to be of a length corresponding to that of the slot in rim manufactured in large numbers, and thus the pressure plate and valve stem could be preformed as one part. Of course the plate 31 could have been a strip of metal trimmed to shape in which case the valve stem 32 would normally not be integral therewith but would be soldered or brazed to plate 31 after it had been cut and trimmed to length. To avoid the need for soldering or brazing a valve stem to a plate and to accommodate longer or variable length slots in the form of the invention under discussion an extra or auxiliary strip 31a (see Fig. 8) is supplied and which is formed without a valve stem and which can be trimmed to length just as can the backing plate strip 39 and the rubber sealing member strip 43. Thus as seen in Figure 8 the assembly is essentially the same as that previously described except that the pressure plate 31a is made separately from the valve stem and trimmed to length. The pressure plate 31a is provided with holes 40c that match with the other holes. The clips 34a serve the same function as the previously described clips 34 except that they may be differently shaped or bent to accommodate the wheel.

A typical rim suitable for this construction appears in Figure 9, this rim being of the type wherein the entire rim is mounted and demounted from the wheel instead of having the main section of the rim fixed to the wheel. Bead seat 53 and flange 54 are formed on the inner rim section and the mid section 56 extends laterally carrying driving lugs 57 and at the outer edge is formed a gutter 58 serving to mount the detachable rim section as well as to wedge the rim on the wheel when mounted, in the usual manner. The rim slot 59 is formed as before except in this instance it is somewhat longer and in this form of rim the slot extends through a portion of the rim 60 which is of smaller diameter then the adjacent rim portion. The detachable rim section 52 has a bead engaging flange 61 and a retaining flange 64. In this construction a tapered shoulder 66 is formed on the detachable section that engages and confines the rubber sealing gasket 67 in cooperation with a split backing ring 68 and the rim gutter. This mounting and sealing construction is likewise described in detail in my foresaid copending application.

The mounting of the valve parts is as previously described except that the pressure plate 31a must be trimmed as indicated in Figure 8, in addition to trimming the backing plate 39 and the rubber sealing strip 43. The only difference between the mounting of the assembly and the action thereof after mounting results from the offset or shoulder but as seen in Figure 11 the backing plate 39 will be hammered or otherwise bent to bring it into alignment with the rim contour. Since the backing plate is formed of thin malleable metal such as brass, this is easily accomplished. It may be necessary to ream the holes with a suitable drill or reamer at places where the parts must be bent or deformed in order to reestablish perfect alignment for reception of the screws. Thus it can be seen that by supplying two metal strips, one rubber strip, and a standard strip integral with the valve stem, both the series of standard short slots may be accommodated and in addition any slot of longer length may also be accommodated. It will also be seen that the plate mounting the valve stem can be mounted so that the valve stem shank extends in either direction.

It should be noticed that in the forms previously shown the locking lugs 57 (if present) can be quite close to or even aligned with the edge of the rim slot without interference by the pressure strip which does not extend past the lateral dimension of the rim slot. The form of the invention shown in Figures 13 and 14 is one adapted for use with rims having long slots wherein the driving lugs are either absent or are spaced from the sides of the rim slot, so that it is not necessary that the pressure plate be confined within the lateral dimensions of the rim slot. As seen in Fig. 13 the rim 71 may have two offsets 71a and 71b this being characteristic of rims manufactured by one of the larger rim suppliers. In this form of the invention the sealing strip 43a is thick enough to extend past the inner surface of the rim. Likewise the pressure plate 31b is different in that as seen in Figure 14 it is wider than the rim slot 79. The mounting of the parts corresponds to that of the forms just described except that with the rim shown, not only must the backing plate 31 be bent to conform to the rim but likewise the pressure plate 31b must be bent in accordance with the offsets 71a and 71b shown in Figure 13. It is likely that in this case the holes at the bent parts must be realigned by reaming or drilling, it being understood that the flow of the sealing strip is sufficient to reestablish perfect seal even though the parts are brought into alignment by such operations. As mentioned and as seen in Figure 14 sealing strip 43a is thick enough to extend past the inner surface of the rim 71. When the pressure plate 31b is forced towards the backing plate 39, the sealing strip 43a is engaged and due to the fact that there is a small initial clearance between the pressure plate 31b and the rim 71, the sealing strip is in effect confined and its material flows to seal against the edge of the slot the screws and the nipple 38 of the valve stem O as previously described. The parts may be proportioned so that the pressure plate 31b is brought into tight engagement with the rim 71 so long as there has been sufficient deforming force applied to the rubber sealing strip by means of the metal screws to effect the seal before such engagement occurs.

Thus, in conclusion it can be seen that by providing a few economically produced simple parts, and by employing a minimum of skill and special tools a wide range of rims with elongated valve slots of various dimensions can be adapted for use with tubeless tires and can be readapted for use with tube tires all as explained earlier in this specification.

In the form of the invention shown in Figure 15, the valve stem 32a is of smaller diameter than that of the other embodiments so that the pressure plate 31a can be passed over the stem. This stem, being of smaller section, might be made of steel instead of brass for adequate strength. The valve stem has a square head as at 80 like that of the screws to rest in one of the countersink holes in backing plate 39 and may be mechanically retained against accidental outward displacement before inflation by a spring friction clip 81 of well known construction.

Although I prefer that the sealing strip 43 be formed of natural or synthetic rubber, I contemplate that it may be formed of other materials having physical properties like that of rubber, all of which may be characterized as being rubbery materials.

I claim:

1. In combination, a vehicle rim for use with tubeless pneumatic tires mounted for inflation on the rim, said rim being circumferentially divided to form a major rim section and a detachable rim section, said major rim section having an elongated slot formed in the base thereof, an elongated backing plate having its outer face exposed to the inflation space of an assembled tire and rim, said backing plate being at least large enough to be coextensive with the slot, a sealing meber of rubbery material disposed in and engaging the walls of said slot and having its outer face engaging the inner face of said backing plate, the inner face of said backing plate lying within the radial confines of said slot, an elongated pressure plate substantially coextensive with but no larger than said slot and having an outer face engaging the inner face of said rubbery sealing member, said radially outer face of said pressure plate also lying within the radial confines of said slot so that said rubbery sealing member is confined within the edges of said slot, a hollow inflation valve stem mounted on one of said plates, apertures through said sealing member and plates communicating with the passage in said hollow valve stem, means for drawing said plates toward one another causing the material of said rubbery sealing member to flow laterally into sealing engagement with the walls of said slot, and means for retaining said assembly in the slot against inflation pressure, said detachable rim section being slidable over said backing plate when the latter is assembled with said major rim section.

2. In combination, a vehicle rim for use with tubeless pneumatic tires mounted for inflation on the rim, said rim being circumferentially divided to form a major rim section and a detachable rim section, said major rim section having an elongated slot formed in the base thereof, an elongated backing plate having its outer face exposed to the inflation space of an assembled tire and rim, said backing plate being at least large enough to be coextensive with the slot, a sealing member of rubbery material disposed in and engaging the walls of said slot and having its outer face engaging the inner face of said backing plate, the inner face of said backing plate lying within the radial confines of said slot, an elongated pressure plate substantially coextensive with and disposed at least partially within said slot and having an outer face engaging the inner face of said rubbery sealing member, a hollow inflation valve stem mounted on one of said plates, apertures through said sealing member and plates communicating with the passage in said hollow valve stem, means for drawing said plates toward one another causing the material of said rubbery sealing member to flow laterally into sealing engagement with the walls of said slot, and means for retaining said assembly in the slot against inflation pressure, said detachable rim section being slidable over said backing plate when the latter is assembled with said major rim section.

3. In combination, a vehicle rim for use with tubeless pneumatic tires mounted for inflation on the rim, said rim being circumferentially divided to form a major rim section and a detachable rim section, said major rim section having an elongated slot formed in the base thereof, an elongated backing plate having its outer face exposed to the inflation space of an assembled tire and rim, said backing plate being at least large enough to be coextensive with the slot, a sealing member of rubbery material disposed in and engaging the walls of said slot and having its outer face engaging the inner face of said backing plate, the inner face of said backing plate lying within the radial confines of said slot, an elongated pressure plate substantially coextensive with but no larger than said slot and having an outer face engaging the inner face of said rubbery sealing member, said radially outer face of said pressure plate also lying within the radial confines of said slot so that said rubbery sealing member is confined within the edges of said slot, a hollow inflation valve stem mounted on said pressure plate, aligned apertures through said sealing member and backing plate, a nipple extending from said hollow valve stem and through said apertures, means for drawing said plates toward one another causing the material of said rubbery sealing member to flow laterally into sealing engagement with the walls of said slot, and means for retaining said assembly in the slot against inflation pressure, said detachable rim section being slidable over said backing plate when the latter is assembled with said major rim section.

4. In combination, a vehicle rim for use with tubeless penumatic tires mounted for inflation on the rim, said rim being circumferentially divided to form a major rim section and a detachable rim section, said major rim section having an elongated slot formed in the base thereof, an elongated backing plate having its outer face exposed to the inflation space of an assembled tire and rim, said backing plate having a thin flanged portion engaging said major rim section at opposite sides of said slot and thickened portion disposed within and substantially coextensive with the slot, a sealing member of rubbery material disposed in and engaging the walls of said slot and having its outer face engaging the inner face of said backing plate, the inner face of said backing plate lying within the radial confines of said slot, an elongated pressure plate substantially coextensive with but no larger than said slot and having an outer face engaging the inner face of said rubbery sealing member, said radially outer face of said pressure plate also lying within the radial confines of said slot so that said rubbery sealing member is confined within the edges of said slot, a hollow inflation valve stem mounted on one of said plates, apertures through said sealing member and plates communicating with the passage in said hollow valve stem, means for drawing said plates toward one another causing the material of said rubbery sealing member to flow laterally into sealing engagement with the walls of said slot, said detachable rim section being slidable over said backing plate when the latter is assembled with said major rim section.

5. In combination, a vehicle rim for use with tubeless penumatic tires mounted for inflation on the rim, said rim being circumferentially divided to form a major rim section and a detachable rim section, said major rim section having an elongated slot formed in the base thereof, an elongated backing plate having its outer face exposed to the inflation space of an assembled tire and rim, said backing plate being at least large enough to be coextensive with the slot, a sealing member of rubbery material disposed in and engaging the walls of said slot and having its outer face engaging the inner face of said backing plate, the inner face of said backing plate lying within the radial confines of said slot, an elongated pressure plate substantially coextensive with but no larger than said slot and having an outer face engaging the inner face of said rubbery sealing member, said radially outer face of said presure plate also lying within the radial confines of said slot so that said rubbery sealing member is confined within the edges of said slot, a hollow inflation valve stem mounted on said pressure plate, aligned apertures through said sealing member and backing plate, a nipple extending from said pressure plate and through said aligned apertures, the passage in said nipple communicating with the passage in said hollow valve stem, means for drawing said plates toward one another causing the material of said rubbery sealing member to flow laterally into sealing engagement with the walls of said slot and said nipple, and means for retaining said assembly in the slot against inflation pressure, said detachable rim section being slidable over said backing plate when the latter is assembled with said major rim section.

6. A valve stem assembly for use with a vehicle rim adapted to be fitted with a tubeless pneumatic tire and having an elongated slot formed in the base of the rim, said assembly comprising an elongated backing plate formed to be substantially coextensive with the rim slot and adapted for mounting with its outer face exposed to the inflation space of an assembled tire and rim, said backing plate having thin supporting flanges for extending over each side of the slot and a thickened intermediate portion for disposition partially within the slot, a sealing member of rubbery material formed for disposition in and for engaging the walls of the slot with its outer face engaging the inner face of said backing plate, an elongated pressure plate dimensioned to fit within and be coextensive with the slot and having an outer face for engagement with the inner face of said rubbery sealing member, a hollow inflation valve stem on said pressure plate, apertures through said sealing member and plates for communicating with the passage in said valve stem, fastening means for connecting said plates and extending through said sealing member, said fastening means drawing said plates toward one another to cause the material of said rubbery sealing member to flow laterally into sealing engagement with the walls of the rim slot, and with said fastening means.

7. A valve stem assembly for use with a vehicle rim adapted to be fitted with a tubeless pneumatic tire and having an elongated slot formed in the base of the rim, said assembly comprising an elongated backing plate formed to be substantially coextensive with the rim slot and adapted for mounting with its outer face exposed to the inflation space of an assembled tire and rim, a sealing strip member of rubbery material formed for disposition in and for engaging the walls of the slot with its outer face engaging the inner face of said backing plate, an elongated pressure plate dimensioned to fit within and be coextensive with the slot and having an outer face for engagement with the inner face of said rubber sealing member, four or more equally spaced holes through said plates and strip, a valve stem support plate having three apertures therethrough aligned with three apertures in said plates and strip, said support plate also being dimensioned to fit within the rim slot, a hollow inflation valve stem on said valve stem support plate at the central aperture thereof, fastening means for extending through all apertures in said plates and strip except those aligned with said valve stem for drawing said plates toward one another to cause the material of said rubbery sealing member to flow laterally into sealing engagement with the walls of the rim slot and with said fastening means, and means for retaining said assembly in the slot against inflation pressure.

8. A valve stem assembly for use with a vehicle rim adapted to be fitted with a tubeless pneumatic tire and having an elongated slot formed in and extending entirely through the base of the rim, said assembly comprising an elongated backing plate formed to be substantially coextensive with the rim slot and adapted for mounting with its outer face exposed to the inflation space of an assembled tire and rim, a sealing member of rubbery material formed for disposition in and for engaging the walls of the slot with its outer face engaging the inner face of said backing plate, an elongated pressure plate formed to be substantially coextensive with and to fit within the slot and having an outer face for engagement with the inner face of said rubbery sealing member, a hollow inflation valve stem on said pressure plate, apertures through said sealing member and plates for communicating with said valve stem, fastening means for connecting said plates and extending through said sealing member, said fastening means drawing said plates toward one another to cause the material of said rubbery sealing member to flow laterally into sealing engagement with the walls of the rim slot, and with said fastening means, and means for retaining said assembly in the slot against inflation pressure.

References Cited in the file of this patent
UNITED STATES PATENTS

| | | |
|---|---|---|
| 2,197,450 | Curtis | Apr. 16, 1940 |
| 2,276,969 | Heinichen | Mar. 17, 1942 |
| 2,277,885 | Rodanet | Mar. 31, 1942 |
| 2,481,142 | Mueller et al. | Sept. 6, 1949 |
| 2,563,787 | Keefe | Aug. 7, 1951 |
| 2,587,470 | Herzegh | Feb. 26, 1952 |
| 2,685,907 | Waddell | Aug. 10, 1954 |